May 21, 1957 A. C. HOWARD 2,792,900
TRACTOR WITH POWER TAKE-OFF AND IMPLEMENT COUPLING MEANS
Filed Dec. 6, 1954 2 Sheets-Sheet 1

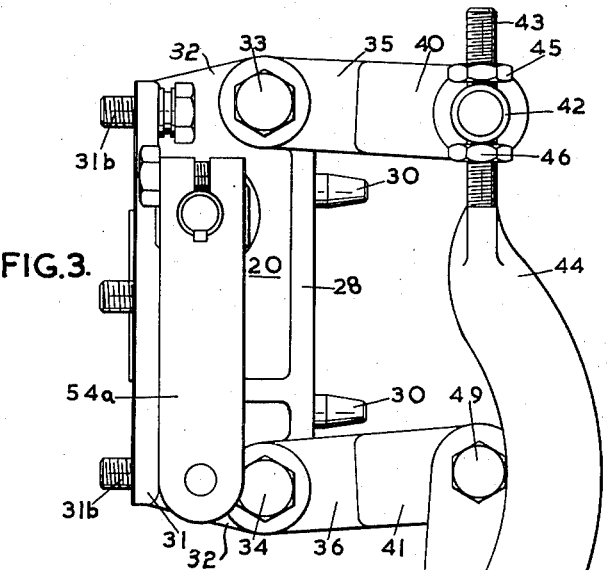
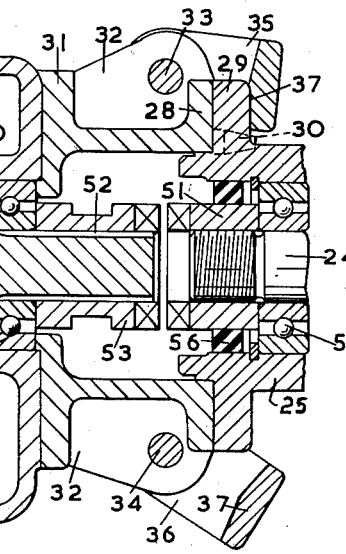

UNITED STATES PATENT OFFICE

2,792,900

TRACTOR WITH POWER TAKE-OFF AND IMPLEMENT COUPLING MEANS

Arthur Clifford Howard, East Horndon, England, assignor to Rotary Hoes Limited, Essex, England Application December 6, 1954, Serial No. 473,403

4 Claims. (Cl. 180—53)

The invention relates to a machine with a substitutable attachment, and its main object is to enable the attachment to be secured in position in an easy and efficient manner.

According to the invention, the portion of the machine to which the attachment is to be secured, and the adjacent portion of the attachment itself, are arranged to abut relatively-non-rotatively, and one of these portions pivotally supports a laterally-spaced pair of members, operable by a single control, to engage over opposite edges of a flange of the other portion for clamping both portions together.

The kind of machine to which the invention mainly relates is one which includes a casing internally supporting a driven shaft which is to drive an aligned output shaft supported in a casing of a substitutable attachment, and, according to a further feature of the invention, means are provided for establishing a driving connection between the shafts when the casings are clamped together.

Although not limited in this respect, the invention is primarily concerned with a garden tractor of the kind including a casing supported from ground-engaging wheels and internally supporting an engine-driven shaft which is to drive an aligned output shaft which is in a second, and detachable, casing and is connected to drive an implement supported from the latter. In this case the output shaft, the second casing and the implement constitute the substitutable work-head.

According to a further feature, relative rotation of the casings is prevented by providing them with interacting dowel means which, while engaging, additionally serve to align the driven, and output, shafts.

The driving connection between the shafts can be effected by a dog-clutch member which is slidably, but relatively-non-rotatively, associated with one of the shafts and resiliently biased for its teeth to engage between coacting teeth at the adjacent end of the other shaft, the dog-clutch member being slidable, against its bias, if the tips of its teeth engage the tips of the coacting teeth when the shafts are offered up to each other, and the bias ensuring proper tooth engagement when the shafts are appropriately rotated relatively to each other. This biasing can be effected by a compression spring encircling the shaft and reacting between a stationary part and the dog-clutch member, or by a spring interposed between a shift lever and a striking fork for sliding the dog-clutch member in the engaging direction. Obviously, however, any known means could be used for the purpose.

The clamping members can be at least mainly of rectilinear U-shape in edge view, being pivoted by their arms from opposite sides of one of the casings and being interconnected by a linkage, with a single operating control, to be movable from an operative position in which the bridge portions of the members engage, with a cam-like action, over the remote side of a flange fast with the other casing, to a position in which the bridge portions liberate the casings for axial separation.

In the accompanying drawings, which illustrate the application of the invention to a garden tractor:

Figure 3 is a plan view corresponding with Figure 2 but showing the clamping members in their clamping position;

Figure 4 is a section on the line 4—4 of Figure 2.

Figure 1:
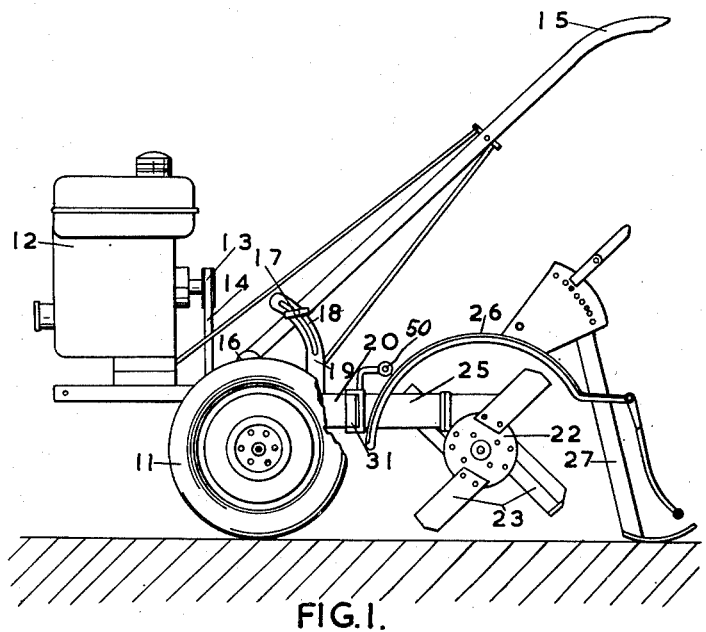
Figure 1 is a side elevation of the tractor, with parts broken away.

Figure 1 shows a garden tractor having a pair of coaxial ground-engaging wheels 11 (one only of which can be seen) driven from an internal combustion engine 12, the drive being through a pulley 13 and belt 14 to a transmission mechanism in a casing situated between the wheels. A pair of handle-bars 15 are hinged to lugs 16, fast with the casing, and held at an adjusted angle by a wing screw 17 working in a slot 18 of a bracket 19 which is also fast with the casing. The casing includes a rear portion 20 which contains a driven shaft 21 (see Figure 4), and the means of the invention (presently to be described) enables an implement to be held in position in such a way as to enable a driven part to be driven from the shaft 21. In the example shown the implement includes a rotor 22 with radially-extending earth-working tools 23, the driving arrangements for the rotor including a shaft 24 within a casing 25. The rotor is surmounted by a guard 26 and it has an adjustable depth control skid 27.

Figure 2:
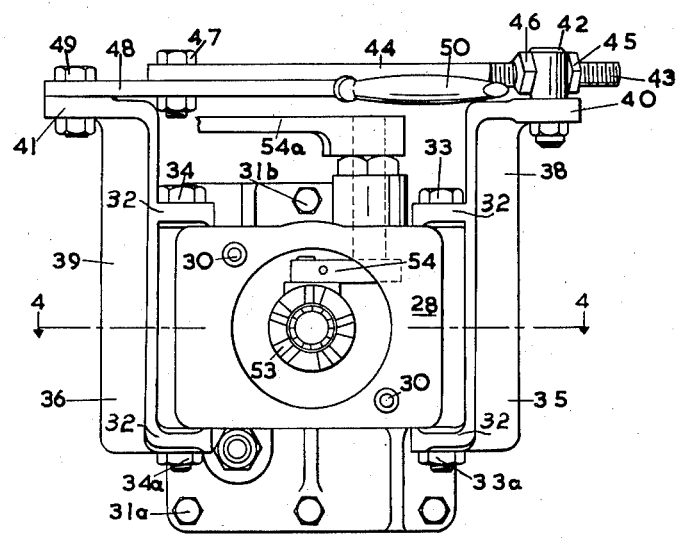
Figure 2 is an axial view, to an enlarged scale, of the rear of the casing to which the work-head is to be secured and showing one arrangement of clamping members in their non-clamping position.

In Figures 2 to 4 the casing portions 20 and 25 are shown provided with respective rectangular flanges 28, 29 at their meeting ends, and the flange 28 carries dowel pins 30, 30 for engaging in holes of the flange 29. Actually the flange 28, as shown, is on a fitting 31 secured to the casing 20 as by bolts 31b, and it has upper and lower pairs of laterally-directed lugs 32, 32 supporting hinge bolts 33 and 34 which are endwise located by nuts 33a and 34a.

Respectively journalled on the hinge bolts 33 and 34 are stirrup-like clamping members 35 and 36, and their bridging portions are chamfered as shown at 37 in Figure 4 for enabling them wedgingly to engage behind the adjacent portions of the flange 29, whereby to hold the latter firmly in engagement with the flange 28. The members 35, 36 have respective upward extensions 38, 39 with outwardly-directed flanges 40 and 41, respectively, at the top. The flange 40 rotatively supports a trunnion 42 having a through-hole in which is engaged a screw-threaded end 43 of a link 44, the end 43 being endwise located by nuts 45, 46. The opposite end of the link 44 is pivoted at 47 to a lever 48 which has a pivotal connection 49 at one end to the flange 41 and is provided at the other end with an operating handle 50.

It will be seen that counter-clockwise movement of the lever 48 in Figure 3 will result in turning the members 35 and 36 outwardly about their pivot bolts 33 and 34 whereby to release the flange 29 and enable the casing parts 20 and 25 to be separated axially, for example, for the purpose of allowing another implement, having a flange like 29, to be substituted.

Figure 4 shows a dog-clutch member 51 fast with the shaft 24 and, splined at 52 to the shaft 21, a coacting dog-clutch member 53 which can be slid axially by a striker fork 54 operated from an external lever 54a. Thus, when the casing parts 20 and 25 have been clamped together the lever 54a can be operated for effecting a driving connection between the shafts 21 and 24. Figure 4 also shows bearings 55, 55a for the clutch, and a sealing washer 56 for preventing leakage of a lubricant contained within the fitting 31.

It will be seen that the earth-working rotor could be substituted by a variety of implements (e. g., a lawnmower, or other implement of which an element is to be driven) with standardised casing flanges 29, and output shafts 24.

What I claim as my invention and desire to secure by Letters Patent of the United States is:

1. A machine for use with a substitutable attachment, said machine and said attachment having respective casing portions arranged to abut each other, a driven shaft supported in the machine casing portion, an output shaft supported in the attachment casing portion, one of said casing portions carrying solely axially extending means preventing relative-rotation of said portions, corresponding apertures in the other of said casing portions, said means engageable in said corresponding apertures while said portions are being offered up to each other by axial movements only whereby to align said shafts, a laterally-extending flange on the other of said portions, a pair of relatively-laterally-spaced clamping members pivotally supported on opposite sides of the machine casing portion on parallel axes, said clamping members having camming surfaces engageable with said other of said portions behind said flange at opposite sides of the flange and of the machine, control means having mechanical advantage positioned laterally to one side of the machine casing portion and interconnecting said clamping members for urging them together about their pivotal supports whereby to urge said portions axially firmly into their abutting relationship, and relatively axially movable engageable members on the adjacent ends of the respective shafts for establishing a driving connection between said shafts when said casing portions are clamped together.

2. A machine for use with a substitutable attachment, said machine and said attachment having respective casing portions arranged to abut each other, one of said casing portions carrying solely axially extending means for enagaging means on the other of said portions for preventing relative-rotation of said portions, a laterally-extending flange on the other of said portions, a pair of generally rectilinearly U-shaped clamping members, parallel pivots supporting said clamping members respectively by their arms from opposite lateral sides of said one of said portions, the distance between the arms of the clamping members being greater than the length of the flange on said other of said portions, the bridge-like portions of said clamping members engagable with said other of said portions behind said flange at opposite sides of the flange, control means positioned laterally to one side of the machine portion and interconnecting said clamping members for urging them together about their pivotal supports whereby to urge said portions firmly into their abutting relationship, a driven shaft supported in the machine casing portion, an output shaft supported in the attachment portions, the shafts having on their adjacent ends relatively axially movable dog clutch members which are engagable when said portions are moved into their abutting relationship.

3. A garden tractor for use with a substitutable attachment, said tractor and said attachment having respective casing portions arranged to abut each other, a driven shaft supported in the tractor casing portion, an output shaft supported in the atttachment casing portion, one of said casing portions carrying solely axially extending means preventing relative-rotation of said portions, corresponding apertures in the other of said casing portions, said means engageable in said corresponding apertures while said portions are being offered up to each other whereby to align said shafts, a laterally-extending flange on the other of said portions, a pair of generally rectilinearly U-shaped clamping members, parallel pivots supporting said clamping members respectively by their arms from opposite lateral sides of said one of said portions, bridge-like portions of said clamping members engageable with said other of said portions behind said flange at opposite sides of the flange, the distance between the arms of the clamping members being greater than the length of the flange on said other of said casing portions, a pair of toggle links positioned at one side of the tractor casing portion interconnecting said clamping members, one of said toggle links extended to form a control handle which in one angular position urges said bridge-like portions together about said pivots, whereby to urge said casing portions firmly into their abutting relationship, and which in moving to another angular position separates said bridge-like portions about said pivots to release said flange, and relatively axially movable dog clutch members on the adjacent ends of the output shaft and driven shaft for establishing a driving connection between said shafts when said casing portions are clamped together.

4. A garden tractor for use with a substitutable attachment, said tractor and said attachment having respective casing portions arranged to abut each other, a driven shaft supported in the tractor casing portion, an output shaft supported in the attachment casing portion, one of said casing portions carrying solely axially extending means preventing relative-rotation of said portions, corresponding apertures in the other of said casing portions, said means engageable in said corresponding apertures while said portions are being offered up to each other whereby to align said shafts, a laterally-extending flange on the other of said portions, a pair of relatively-laterally-spaced clamping members having arms pivotally supported on parallel axes from said one of said portions, said clamping members engageable with said other of said portions behind said flange at opposite sides of the flange, the distance between the arms of the clamping members being greater than the length of the flange on said other of said portions, and control means being positioned to one side of the portions and interconnecting said clamping members for urging them together about their pivotal supports whereby to urge said portions firmly into their abutting relationship, a slidable dog-clutch member on one of said shafts, a coacting dog-clutch member fast with the other of said shafts, and means operable to engage and disengage said dog-clutch members.

References Cited in the file of this patent

UNITED STATES PATENTS

| | | |
|---|---|---|
| 345,672 | Casner | July 20, 1886 |
| 400,093 | Le Suer et al. | Mar. 26, 1889 |
| 887,420 | Neumann | May 12, 1908 |
| 1,683,589 | Aalborg | Sept. 11, 1928 |
| 1,698,929 | Wentorf | Jan. 15, 1929 |
| 1,743,839 | Wear | Jan. 14, 1930 |
| 1,945,752 | Pagano | Feb. 6, 1934 |
| 2,636,568 | Rutishauser | Apr. 28, 1950 |

FOREIGN PATENTS

| | | |
|---|---|---|
| 648,028 | Germany | July 22, 1937 |
| 99,778 | Sweden | Sept. 3, 1940 |
| 191,712 | Switzerland | June 30, 1937 |